No. 679,265. Patented July 23, 1901.
H. F. RAMBLER.
FRUIT PICKER.
(Application filed June 9, 1900.)
(No Model.)
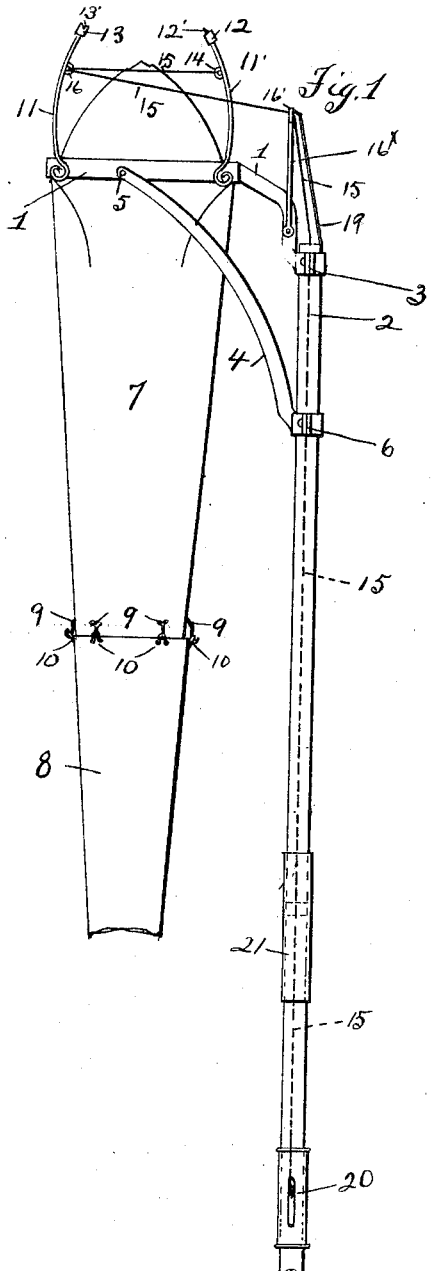
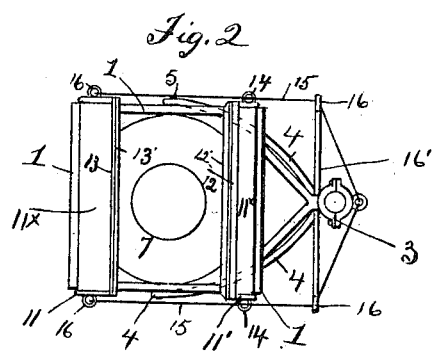
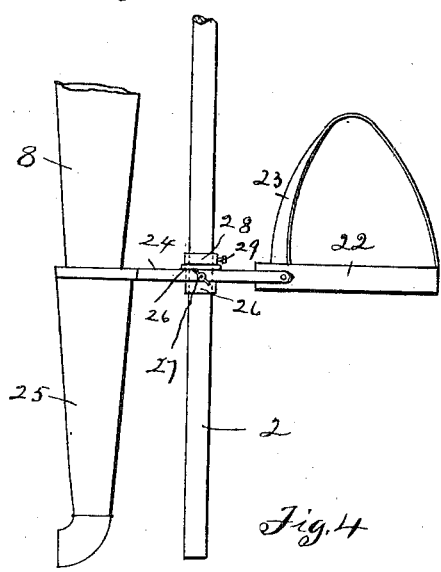
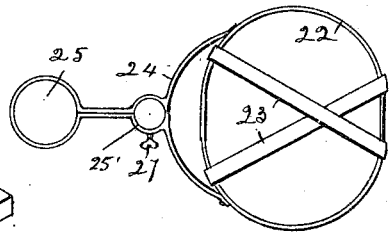
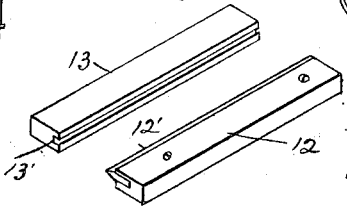
WITNESSES:
M. Hunter
H. M. Levis
INVENTOR
Homer F. Rambler
BY O. D. Levis
ATTORNEY.

UNITED STATES PATENT OFFICE.

HOMER F. RAMBLER, OF VERSAILLES, PENNSYLVANIA, ASSIGNOR OF ONE-HALF TO OWEN B. FARLEY, OF McKEESPORT, PENNSYLVANIA.

FRUIT-PICKER.

SPECIFICATION forming part of Letters Patent No. 679,265, dated July 23, 1901.

Application filed June 9, 1900. Serial No. 19,656. (No model.)

*To all whom it may concern:*

Be it known that I, HOMER F. RAMBLER, a citizen of the United States of America, residing at 600 Third avenue, Versailles, in the county of Allegheny and State of Pennsylvania, have invented certain new and useful Improvements in Fruit-Pickers; and I do hereby declare the following to be a full, clear, and exact description thereof, reference being had to the accompanying drawings, which form a part of this specification.

This invention relates to certain new and useful fruit-pickers; and the invention has for its object the provision of a device for removing fruit from trees, the same being simple in construction, easily operated, and comparatively inexpensive to manufacture.

With the above object in view the invention finally consists in the novel construction, combination, and arrangement of parts, as will be hereinafter more fully described in detail.

In describing the invention in detail reference is had to the accompanying drawings, forming a part of this specification, wherein like numerals of reference designate like parts in the several views, in which—

Figure 1 is a vertical side view showing the upper portion of the device. Fig. 2 is a plan view of the same. Fig. 3 is a vertical side view of the lower portion of the device. Fig. 4 is a plan view of the support for the pole. Fig. 5 represents perspective views of the cutting-jaws of the device.

In the drawings the numeral 1 designates a frame which is attached to the upper end of the pole 2 by the straps 3 and is further secured by the arms 4, connected to the frame by rivets 5 and to the pole by straps 6. A tapering canvas bag 7 is suitably attached to the inside of the frame and is attached to another bag-section 8 by hooks 9 and eyelets 10. To the upper portion of the frame is attached the spring-arms 11 and 11′, between each pair of which aprons 11× (shown in Fig. 2) are mounted. To the upper ends of one pair of said arms 11′ a jaw 12 is mounted, which is provided with a knife 12′. The other set of arms 11 are fastened to the jaw 13, which is grooved at 13′ to receive the knife 12′ when said jaws are closed together. To the arms 11′ are attached eyelets 14, to each of which is connected a cord 15, said cords passing down through the hollow handle 2, each having first passed through an eyelet 16, and the lower ends of the cords 15 are attached to a bolt carried by a sliding slotted sleeve 20, operating on the handle. The pole 2 is formed in two sections coupled together (21) in any suitable manner for the convenience of transporting the apparatus from place to place. To the upper end of the pole 2 is fastened a brace 19, which is fastened at its upper end, Fig. 1, to the cross-arm 16′, supported by the rod 16×, the ends of said arm 16′ having eyes through which the cords 15 pass.

22 is a belt having a shoulder-strap 23 and adapted to be worn by the operator. This belt has attached to it the frame 24, whose opposite ends are connected to a boot 25, which loosely engages over the end of the canvas bag 8. A collar 25′ is formed about the middle of the frame and fits over a flanged sleeve 26 upon the pole, said sleeve being held to the frame 24 by a set-screw 27 and adjustably held upon the pole by a collar 28, said collar being held on the pole by a set-screw 29.

In use the operator attaches the belt and braces to his body. He then adjusts the collar 29 to the desired point along the pole, so that the upper end of the device will be within reach of the fruit. When the fruit is in position between the jaws, the sleeve 20 is drawn downward, which action closes the jaws upon the fruit, and as the knife severs the stem of the fruit the said fruit falls down the bag and out of the end of the boot. When the sleeve 20 is released, the jaws again open.

Slight modifications may be made in the details of the invention without departing from the spirit of the invention.

Having thus described my invention, what I claim, and desire to secure by Letters Patent, is—

1. A fruit-picker, comprising a pole, a bag-supporting frame mounted thereon, spring-arms secured to and arranged in pairs on opposite sides of said frame, aprons between each pair of arms, jaws secured to said arms, a knife seated in one jaw, and the other grooved to receive said knife, eyes on the arms, and cords fixed to one pair of arms, and having sliding contact with the eyes on the other pair of arms, and means for operating the cords, as set forth.

2. In a fruit-picker of the class described, the combination with the pole and belt and a bag supported by the pole, of the frame 24 connected with the belt and having a boot 25 at its outer end to engage on the end of the bag, the flanged sleeve 26 engaging said frame and pole, the collar 28 and set-screws for said frame and collar, all arranged and combined, substantially as and for the purpose described.

3. In a fruit-picker, the combination with the pole, the frame clamped thereto, the bag secured to said frame, the spring-arms fastened to said frame, and in pairs on opposite sides thereof, the jaws mounted on said arms, the eyes 14 and 16, the cords secured to said eyes 14, and sliding through said eyes 16, the arm $16^X$ secured to the top of the pole, the cross-arm 16' having eyes through which said cords pass, and the sliding handle working on the pole, and to which handle said cords are connected, as shown and described.

In testimony whereof I have hereunto affixed my signature in the presence of two subscribing witnesses.

HOMER F. RAMBLER.

Witnesses:
JOHN GROETZINGER,
H. J. LEVIS.